UNITED STATES PATENT OFFICE 2,588,570

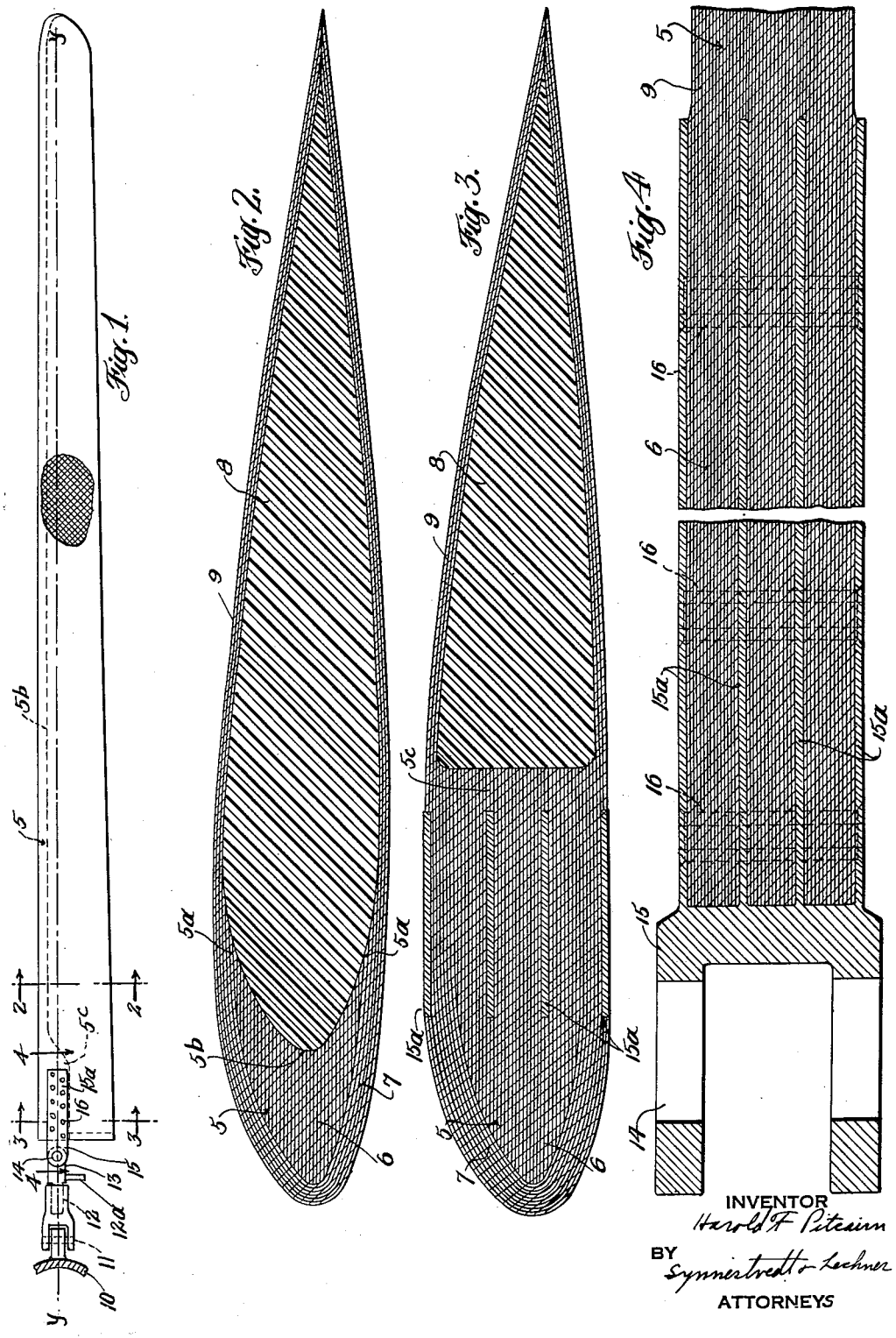

BLADE CONSTRUCTION FOR AIRCRAFT SUSTAINING ROTORS

Harold F. Pitcairn, Bryn Athyn, Pa., assignor to Autogiro Company of America, Philadelphia, Pa., a corporation of Delaware Application October 31, 1946, Serial No. 706,996

5 Claims. (Cl. 170—159)

This invention has to do with rotary winged aircraft, and more specifically with elongated rotor blades for aircraft sustaining rotors.

One of the objects of the invention is a construction for longitudinal strength members for rotor blades which is suited to mass production and assembly.

Another object of the invention is a strength member for a rotor blade whose mass and strength are concentrated in the forward portion of the blade, but which provides for stiffening of the blade throughout a considerable portion thereof to the rear of the nose portion.

A still further object of the invention is the provision of a novel means for connecting the rotor blade to the blade linkage and hub, as will further appear.

Another object is a construction for a rotor blade in which the nose comprises layers of impregnated fabric and the skin of the blade also comprises impregnated layers of fabric, the fabric of the skin and nose portion being unitarily bonded together.

Referring now to the drawings:

Figure 1 is a plan view of a rotor blade constructed in accordance with the invention, showing the blade, blade mounting means, blade pivots, and a fragment of a rotor hub.

Figure 2 is a chordwise sectional view of the same blade, but on an enlarged scale, taken along the line 2—2 in Figure 1.

Figure 3 is also a chordwise sectional view on an enlarged scale, but taken along the line 3—3, and showing the connecting means.

Figure 4 is a longitudinal sectional view of the root end of the blade on an enlarged scale, taken along the line 4—4 in Figure 1.

Although the nose portion 5 is disposed substantially within the forward 25% of the blade, as shown in Figure 1, it will be seen in Figure 2 that the upper and lower surfaces 5a—5a of the nose portion extend farther toward the rear of the blade than does the center portion 5b of the nose; and from Figure 1 it will be discovered that the nose portion is considerably wider in the neighborhood of the root of the blade than it is throughout the rest of its length, as shown at 5c. The general form of the longitudinal strength member or nose portion, then, is recessed or channeled along its rear edge. In the particular form illustrated the nose portion takes the form of an elongated mass, having a contour limited by two intersecting curves, the curve defining the rear of the nose portion being concave and that along the front being convex, and the mass, viewed in plan, having a widened portion at one end.

The center of the nose portion comprises flat horizontal layers 6 of extremely strong fabric, which are partially surrounded by curved layers 7 of similar fabric, all of the layers being laid up to form a mass of the shape described, impregnated with a suitable bonding material, and molded together. Although any fabric having the necessary tensile strength and shear resistance may be used, I have found that "Fiberglas" or other similar glass fibre fabric has the desired properties, and accordingly it is used in the preferred embodiment of the invention. This "Fiberglas" comprises glass filaments, and according to the invention such filaments are employed in the form of cloth or fabric woven from threads spun from the "Fiberglas." The weave of the fabric may advantageously be similar to duck or sail cloth. For the bonding material, I prefer to use a thermosetting plastic material, such as "Selectron 5003," an alkyd resin. The combination of "Fiberglas" fabric impregnated with "Selectron 5003" results in a laminate having exceptionally high tensile strength, impact resistance, and torsional rigidity. Other plastic or resinous materials may be employed for impregnation and bonding of the layers of glass fabric, for instance, urea-formaldehyde resins, or phenol formaldehyde resins.

According to the invention, the nose portion built up as described performs three principal functions: it carries the major part of the centrifugal load imposed upon the whole blade; it stiffens the blade providing rigidity for the blade which is greater in the plane of the chord than in the flapping plane; and it defines the contour of a portion of the blade.

The nose portion described is thus well adapted for use in conjunction with a trailing portion of low tensile strength and correspondingly low weight. These properties are highly desirable in that a trailing portion of such characteristics makes possible the location of the chordwise center of gravity of the blade well forward. However, in order to utilize such a trailing portion, the trailing portion must be relieved of all function other than defining the contour of the blade and, therefore, may only be used in connection with a nose portion of high tensile strength together with means for securing the trailing portion to the nose portion. A combination of the nose portion herein described with such a core portion makes possible a blade in which the chordwise center of gravity is located at a distance approximately 25% of the chord from the leading edge of the blade without the use of counterweights. This optimum location is indicated in Figure 1 by the lines y—y. Thus the blade combines two highly desirable features, that of optimum location of the chordwise center of gravity and of low absolute mass.

The rearward extension of the upper and lower portions 5a—5a of the nose, as disclosed in Figure 2 has the effect of extending the stiffening action of the nose portion over a larger part of the blade than would otherwise be possible with the same mass.

In the embodiment of the invention disclosed the nose portion described above is used in association with a core or trailing edge portion 8 made of an expanded or cellular material selected for its low density and form retaining capability, such as expanded cellulose acetate foam, urea-formaldehyde foam, or expanded rubber foam. Most of such materials have low tensile strength, but high tensile strength is not required because, as described below, the tensile loads are carried by a strong skin 9 which is bonded to the expanded core and to the nose portion.

The skin 9 just mentioned comprises one or more layers of glass fibre fabric of the type employed in the nose, the layer or layers completely surrounding the blade and bonded to both the nose and core as by an adhesive or resin type impregnant. Such impregnant may be of the type used in impregnating and bonding the fabric layers of the nose portion of the blade. At least one of the skin layers is advantageously applied with the weave extended at an oblique angle to the longitudinal axis of the blade, desirably 45° as is shown in Figure 1. Preferably a plurality of layers is employed. In the event that more than one layer is contemplated at least one layer should be applied with threads thereof extending parallel to the longitudinal axis of the blade, in addition to the oblique layer mentioned just above.

I have found that in a blade consisting of my novel nose portion, a core portion of some expanded material of low tensile strength and low mass, and a skin of high tensile strength bonded to the nose and core portions, that a high degree of torsional rigidity may be obtained without depending upon any other structure than the nose portion and the skin for strength. In this connection it is noted that the shape of the nose portion illustrated, i. e., channelled at its rear surface, results in extension of the support for the skin well to the rear of the center of mass of the nose, and thereby cooperates with the skin in providing a high degree of torsional rigidity, with a minimum total weight. The rigidity is still further enhanced by the oblique orientation of one or more skin layers relative to the blade.

In Figure 1 it will be seen that the rotor blade is connected to the rotor hub 10 through a system of pivots and links, there being a flapping pivot 11 connected to the hub, a pitch-changing swivel 12 connected to the flapping pivot, and a drag link 13 and drag pivot 14 interconnecting the pitch changing means with the blade root fitting 15. This root fitting comprises a novel attachment means, having at its inner end means adapted to cooperate with the drag pivot and at the opposite end a series of parallel projecting leaves 15a, adapted to interengage the layers of fabric in the nose portion. The leaves may advantageously be placed in interengagement with the fabric at the time of molding the nose portion, in which case the attachment means becomes intimately bonded to the nose portion. Instead of or in addition to the bonding, attachment may be effected by the use of rivets or studs 16 adapted to penetrate the leaves and the layers of fabric, and thus lock them in fixed relationship to each other.

It will be noted that the attachment means is anchored in the widened portion 5c of the nose section, in order that the pivotal movement about the drag pivot may take place in the vertical radial plane containing the chordwise center of gravity of the blade (see line y—y in Figure 1). In this manner the point of attachment is located at the dynamically desirable point; and at the same time is associated with the load carrying portion of the blade.

It will be understood that the nose portion here disclosed may be used in different kinds of rotor blades than the one described by way of example, although the use of this type of nose with the particular kind of skin described is especially advantageous for reasons given above.

A blade as described above may be made up and assembled in various ways. Preferably, the nose and core portions are separately formed, then brought together and covered in common by the skin.

In making up the nose portion, a mold or form may be used, in one end of which the leaves 15a of the mounting fitting 15 are positioned. The glass fabric layers of the nose are then laid in place. Advantageously, the impregnating or bonding material is spread between the layers of fabric as they are laid up. Various of the bonding agents contemplated for use in the invention come in different forms, some being liquid, some powdery, and some in sheet form. Preferably, a thermosetting resin is used and may be cured at this stage by application of heat and pressure, which will effectively impregnate the fabric. Thereafter, the nose and a suitably shaped core are brought together and covered by applying the skin layers thereto, which are also desirably laid up with intervening layers of the impregnating or bonding material which, in the case of many of the resin type materials contemplated for use, is subsequently set by application of heat.

In any case, the pressure and temperature conditions of the bonding operation should be such as will result in not only impregnating the space between the layers but also the interstices between the threads of each layer and even to some extent the fibres composing each thread. In the case of the external layer, sufficient impregnant material is employed to provide a slight excess on the surface, which, as a result of contact with the smooth inside surface of the mold, will form a highly polished and aerodynamically efficient surface.

The nose portion, expanded plastic core, and skin may be assembled in a suitable mold with uncured resin between the layers of fabric and between the skin and core. By the application of heat and pressure the bonding operation is completed. In this fashion the manufacturing operations are kept to a minimum.

The use of thermosetting resins in the skin and in either or both the nose and core (for instance, urea formaldehyde in all three) is of advantage, since the impregnated fabric of the skin may then be bonded to one or both the nose and core portions of the blade by application of heat. Removal from the pressure fixture may be made without waiting for cooling.

When the skin, core, and nose portions are fabricated separately and then assembled, it is preferable to use a separate cement or adhesive between the assembled parts, such cement being selected to provide adhesion to both materials. Such a cement may be of the vinyl type or rubber cement type such as cyclized rubber, for example, Cycleweld #4624 (E. I. du Pont de Nemours & Company, Inc.), which will provide good adhesion between the nose and skin and between the core and skin when heat is applied in the presence of pressure.

Among the advantages of the invention is that of providing a longitudinal strength member for rotor blades which is capable of defining a portion of the contour of the blade of carrying substantially all of the centrifugal load imposed upon the whole blade, and of contributing considerable torsional rigidity to the blade while maintaining the center of gravity of the blade well forward. The torsional rigidity provided by the nose portion together with the impregnated glass fabric skin is of especial advantage in a rotor blade mounted for pitch change movement as shown in Figure 1, in which the rotor blade pitch angle is controllable by the pitch control arm 12a.

Another advantage of the invention is the ease of construction and economy of manufacture of rotor blades constructed in accordance therewith.

A further advantage of the invention is the provision for simple attachment to the nose portion of a skin, other structural elements, or connecting means, by molding such elements integrally with the nose portion.

A still further advantage of the invention lies in the use of materials which are inexpensive, easy to fabricate, and of high tensile strength per unit of mass.

A further advantage of the invention is the employment of material which at once provides maximum structural strength and highly desirable surface characteristics, particularly with respect to surface finish and maintenance of contour under load.

I claim:

1. For an aircraft sustaining rotor, an elongated blade having a nose portion comprising layers of woven glass fabric impregnated with an adhesive material, the said nose portion being adapted to carry substantially all of the centrifugal load imposed upon the whole blade.

2. An elongated blade for aircraft sustaining rotors having a longitudinal primary strength member comprising layers of glass fabric impregnated with a resinous material said member being of thickness approximating the thickness of the blade and substantially defining a portion of the contour of the blade, and a skin comprising layers of glass fabric impregnated with a resinous material and bonded to the said strength member throughout a substantial part of the area thereof.

3. For an aircraft sustaining rotor, an elongated blade having a nose portion comprising layers of fabric impregnated with an adhesive material, the said nose portion being adapted to carry substantially all of the centrifugal load imposed upon the whole blade, and to define the contour of the nose portion of the blade, the nose portion being recessed along its rear face to provide a rearwardly projecting lip adjacent a surface of the blade, a cellular core in large part defining the trailing edge portion of the blade and having its forward face shaped to interfit with the recessed rear face of the nose portion, and a resin-impregnated fabric skin surrounding the nose and core portions and bonded substantially throughout the blade-contour defining surfaces thereof.

4. A construction in accordance with claim 3 in which the rear face of the nose portion is channelled to provide rearwardly projecting lips adjacent both the upper and lower surfaces of the blade.

5. For an aircraft sustaining rotor, a blade comprising a primary longitudinally extending strength member of thickness approximating the thickness of the blade and adapted to carry substantially all of the centrifugal load on the entire blade, and further comprising a contour defining skin, the strength member and the skin both being formed of resin-impregnated glass fabric and being unitarily bonded to each other.

HAROLD F. PITCAIRN.

REFERENCES CITED

The following references are of record in the file of this patent:

UNITED STATES PATENTS

| Number | Name | Date |
| --- | --- | --- |
| 1,567,574 | Clay | Dec. 29, 1925 |
| 2,155,375 | Jablonsky | Apr. 18, 1939 |
| 2,182,812 | Lougheed | Dec. 12, 1939 |
| 2,183,158 | Bennett | Dec. 12, 1939 |
| 2,303,707 | Pullin | Dec. 1, 1942 |
| 2,414,125 | Rheinfrank, Jr. | Jan. 14, 1947 |
| 2,420,174 | Hunt | May 6, 1947 |
| 2,426,123 | Sikorsky | Aug. 19, 1947 |
| 2,467,031 | Hess | Apr. 12, 1949 |
| 2,470,056 | Siebel | May 10, 1949 |